Aug. 23, 1932.   B. L. ELLIOTT   1,872,705
PARACHUTE
Filed April 26, 1930
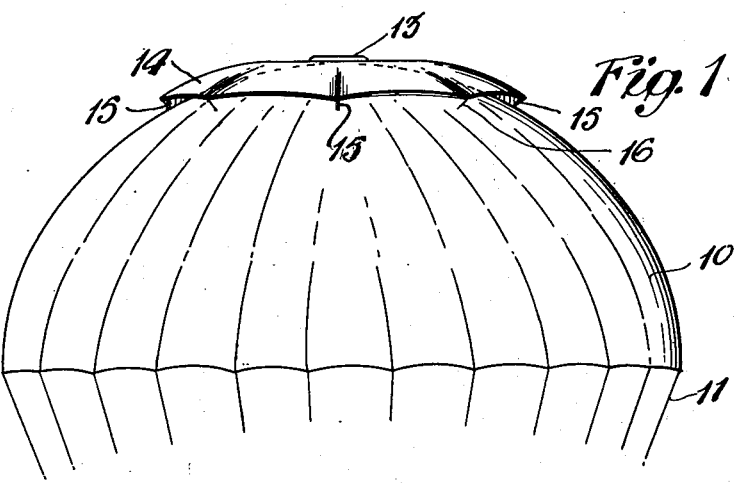
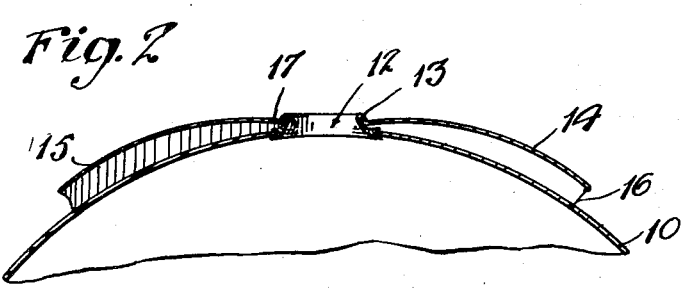
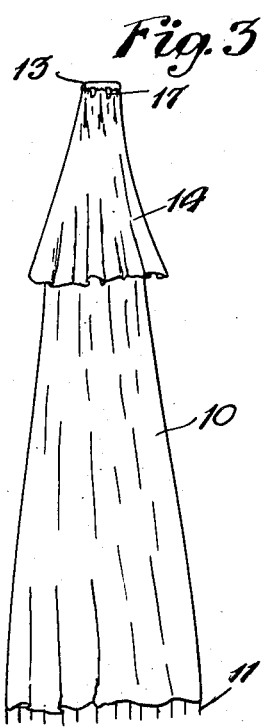
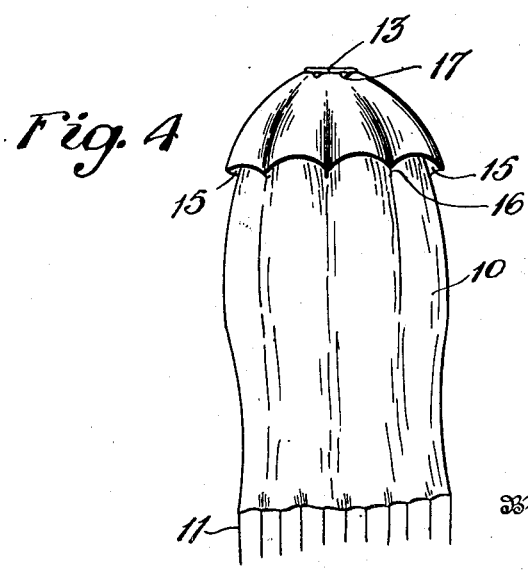
Benjamin L. Elliott
Inventor Patented Aug. 23, 1932

1,872,705

UNITED STATES PATENT OFFICE

BENJAMIN L. ELLIOTT, OF PERRY TOWNSHIP, BROWN COUNTY, OHIO

PARACHUTE

Application filed April 26, 1930. Serial No. 447,759.

My invention relates to improvements in parachutes.

An important object of my invention is the provision of a parachute which has positive means for opening.

Another object of my invention is to provide a parachute which is of simple construction, efficient in operation and which has a high safety factor.

Other objects and advantages of my invention will be apparent during the course of the following description.

In the accompanying drawing, which forms a part of this specification, and wherein like characters of reference denote like parts throughout the same, Figure 1 is a side elevation of an inflated parachute embodying my invention, Figure 2 is a fragmentary vertical sectional view thereof, Figure 3 is an elevation of the deflated parachute, and, Figure 4 is an elevation thereof showing the manner in which the parachute is opened.

In the drawing, wherein for the purpose of illustration is shown a preferred embodiment of my invention, the numeral 10 designates the canopy of the parachute having the usual shrouds 11. The usual vent or opening 12 is arranged at the peak of the canopy and is preferably provided with a reinforcement such as the stiffener or collar 13.

With the usual parachute, the canopy is pulled from its pack, as by means of a pilot parachute, and the air entering through the lower end of the parachute serves to open it. The pressure of the atmosphere tends to prevent opening of the parachute, and this pressure coupled with twisting of the shroud lines, often prevents the parachute from opening. In order to assure positive opening of the parachute, therefore, I provide a cape 14 which may be secured to the canopy 10 but is preferably secured to the stiffening collar 12 as shown in Figure 2, and which is arranged at the top of the parachute canopy on the exterior thereof and extends towards the bottom of the canopy for a substantial distance. I have illustrated the cape as extending for slightly less than a third of the length of the canopy, and while this length of the cape is not necessary, it is essential that the cape extend a substantial distance from the peak of the canopy to assure positive opening thereof.

The cape 14 is secured to the canopy, lengthwise of the cape, by means of stays or flaps 15 which divide the inside of the cape into sections. There may be any number of these stays but in order to simplify the construction of the parachute I have provided cords 16 midway between adjacent stays and which take the place of additional stays. These cords 16 connect the lower end of the cape with the parachute canopy.

The cape is provided adjacent its upper end with openings 17, there being at least one opening for each section or compartment of the cape, and these openings allow the air trapped in the cape to escape gradually.

Although a pilot parachute may be used to pull the main parachute from the pack, the cape 14 will also perform this function, and the pilot parachute may be safely dispensed with. When the parachute with my cape arranged thereon is first pulled from the pack and starts to fall, the air will enter the cape 14 and swell it outwardly. Reference to Figure 3 shows the position of the cape before being inflated, and illustrates the cape-like form of this improvement and the ease with which the air may fill the cape. In Figure 4 is seen the position of the cape as it fills with air. As the cape fills it exerts a strong outward pull on the main parachute canopy at a point spaced a substantial distance from the peak thereof. This outward pull spreads the canopy and causes it to fill with air.

The openings 17 in the top of the cape allow the gradual escape of air therefrom, and prevent the tearing of the cape, as well as forming a suction by the continual passage of air therethrough, which assists in opening the canopy of the main parachute.

It will be seen that the cape 14 is arranged around the opening 12 in the peak of the canopy and does not in any way obstruct this opening. The cape, in addition to opening the parachute will also give additional "lift"

thereto, will steady the parachute, and consequently will greatly enhance the efficiency of the parachute.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A parachute comprising a canopy having an opening in its peak, a cape secured exteriorly of said canopy and having an opening which corresponds to the opening in the canopy, said cape extending towards the bottom of the canopy for a substantial distance, and means connecting portions of said cape adjacent its lower end with the canopy.

2. A parachute comprising a canopy having an opening in its peak, a cape secured exteriorly of said canopy and having an opening in its peak corresponding in position to the opening in the canopy, said cape extending towards the bottom of the canopy for a substantial distance, and stays extending lengthwise of said cape and connecting the cape with the canopy to divide the cape into a plurality of compartments.

3. A parachute comprising a canopy having an opening in its peak, a cape arranged exteriorly of the canopy and having an opening in its peak corresponding to the opening in the canopy, the cape and canopy being secured together adjacent the edges of the openings, stays connecting the cape with the canopy lengthwise thereof, said stays dividing the cape into a plurality of compartments, said cape having openings therein adjacent its peak, there being an opening for each compartment to permit the escape of air therefrom.

In testimony whereof I affix my signature.

BENJAMIN L. ELLIOTT.